United States Patent
Jackson et al.

(10) Patent No.: US 11,942,753 B2
(45) Date of Patent: Mar. 26, 2024

(54) FOLDED SLAB LASER

(71) Applicant: KERN TECHNOLOGIES, LLC, Wadena, MN (US)

(72) Inventors: Paul E Jackson, Wadena, MN (US); Gerald L Kern, Wadena, MN (US); Jacob D Colby, Wadena, MN (US); Aaron M Kern, Wadena, MN (US); Tyler P Schmidt, Wadena, MN (US); Keith L Weiher, Wadena, MN (US)

(73) Assignee: KERN TECHNOLOGIES, LLC, Wadena, MN (US)

( * ) Notice: Subject to any disclaimer, the term of this patent is extended or adjusted under 35 U.S.C. 154(b) by 720 days.

(21) Appl. No.: 17/025,439

(22) Filed: Sep. 18, 2020

(65) Prior Publication Data

US 2021/0006031 A1 Jan. 7, 2021

Related U.S. Application Data

(62) Division of application No. 16/364,004, filed on Mar. 25, 2019, now Pat. No. 10,811,838.

(30) Foreign Application Priority Data

Apr. 4, 2018 (EP) .................................... 18165802

(51) Int. Cl.
*H01S 3/03* (2006.01)
*H01S 3/034* (2006.01)
(Continued)

(52) U.S. Cl.
CPC ........ *H01S 3/08095* (2013.01); *H01S 3/0315* (2013.01); *H01S 3/034* (2013.01);
(Continued)

(58) Field of Classification Search
CPC ....... H01S 3/076; H01S 3/0315; H01S 3/0818
See application file for complete search history.

(56) References Cited

U.S. PATENT DOCUMENTS

| 3,735,030 A | 5/1973 | Proper |
| 4,719,639 A | 1/1988 | Tulip |

(Continued)

FOREIGN PATENT DOCUMENTS

| CN | 2370594 Y | 3/2000 |
| DE | 3640572 | 6/1998 |

(Continued)

OTHER PUBLICATIONS

"The Waveguide Laser: A Review", J. Degnan, Applied Physics, vol. 11, pp. 1 33, (1976).

(Continued)

*Primary Examiner* — Sean P Hagan
(74) *Attorney, Agent, or Firm* — Nemphos Braue LLC; Michael Antone

(57) ABSTRACT

A folded slab waveguide laser having a hybrid waveguide-unstable resonator cavity. Multiple slab waveguides of thickness 't' supporting vertical waveguide modes are physically arranged above one another in a stack and optically arranged in series through one or more cavity folding assemblies with curved mirrors. A gain medium such as a gas is arranged in each slab. Each cavity folding assembly is designed to redirect the radiation beam emitted from one slab waveguide into the next waveguide and also at the same time to provide a focus for the radiation beam so that a selected vertical waveguide mode (or modes) is (or are) coupled efficiently into the next slab.

14 Claims, 9 Drawing Sheets

(51) Int. Cl.
  *H01S 3/07* (2006.01)
  *H01S 3/08* (2023.01)
  *H01S 3/08045* (2023.01)
  *H01S 3/081* (2006.01)
  *H01S 3/097* (2006.01)
  *H01S 3/223* (2006.01)

(52) U.S. Cl.
  CPC .......... *H01S 3/076* (2013.01); *H01S 3/08045* (2013.01); *H01S 3/08059* (2013.01); *H01S 3/0813* (2013.01); *H01S 3/09702* (2013.01); *H01S 3/08063* (2013.01); *H01S 3/0816* (2013.01); *H01S 3/0818* (2013.01); *H01S 3/2232* (2013.01)

(56) References Cited

U.S. PATENT DOCUMENTS

| | | | |
|---|---|---|---|
| 4,939,738 | A | 7/1990 | Opower |
| 5,048,048 | A * | 9/1991 | Nishimae ............ H01S 3/03 372/64 |
| 5,140,606 | A | 8/1992 | Yarborough |
| 5,353,297 | A | 10/1994 | Koop et al. |
| 5,386,431 | A * | 1/1995 | Tulip ............ H01S 3/0315 359/348 |
| 5,436,926 | A | 7/1995 | Laakmann |
| 5,608,745 | A | 3/1997 | Hall |
| 5,684,820 | A * | 11/1997 | Jenkins ............ H01S 3/0805 372/98 |
| 6,137,818 | A | 10/2000 | Jackson |
| 6,144,687 | A | 11/2000 | Jackson |
| 6,442,187 | B1 | 8/2002 | Dutov |
| 7,460,577 | B2 | 12/2008 | Morrow |
| 10,811,838 | B2 * | 10/2020 | Jackson ............ H01S 3/0315 |
| 2005/0094697 | A1 | 5/2005 | Armier |
| 2009/0165954 | A1 | 7/2009 | Kuthi |
| 2012/0195342 | A1 | 8/2012 | Cohn |
| 2016/0233640 | A1 | 8/2016 | Morrow |

FOREIGN PATENT DOCUMENTS

| | | |
|---|---|---|
| EP | 0011679 A2 * | 6/1980 |
| WO | 2012084425 | 6/2012 |

OTHER PUBLICATIONS

"Comparisons of waveguide folding geometries in a CO2 z-fold laser" Paul E. Jackson, Denis R. Hall, and Christopher A. Hill, Appl. Opt. 28, 935-941 (1989).

"CO2 Large-area Discharge Laser Using an Unstable-waveguide Hybrid Resonator", Jackson, et al., Applied Physics Letters, vol. 54, No. 20, pp. 1950, May 1989.

"Finite-Aperture Waveguide-Laser Resonators", J. J. Degnan and D. R. Hall, IEEE J. Quantum Electron. QE-9, 901 (1973).

"Novel Technology and Performance of a High-Power CO2 Waveguide Laser", P.C. Conder, J.R. Redding and R.M. Jenkins Infrared Physics, Issues 1-2, vol. 25, pp. 61-67 (1985).

* cited by examiner $Z = d1 + h + d2$

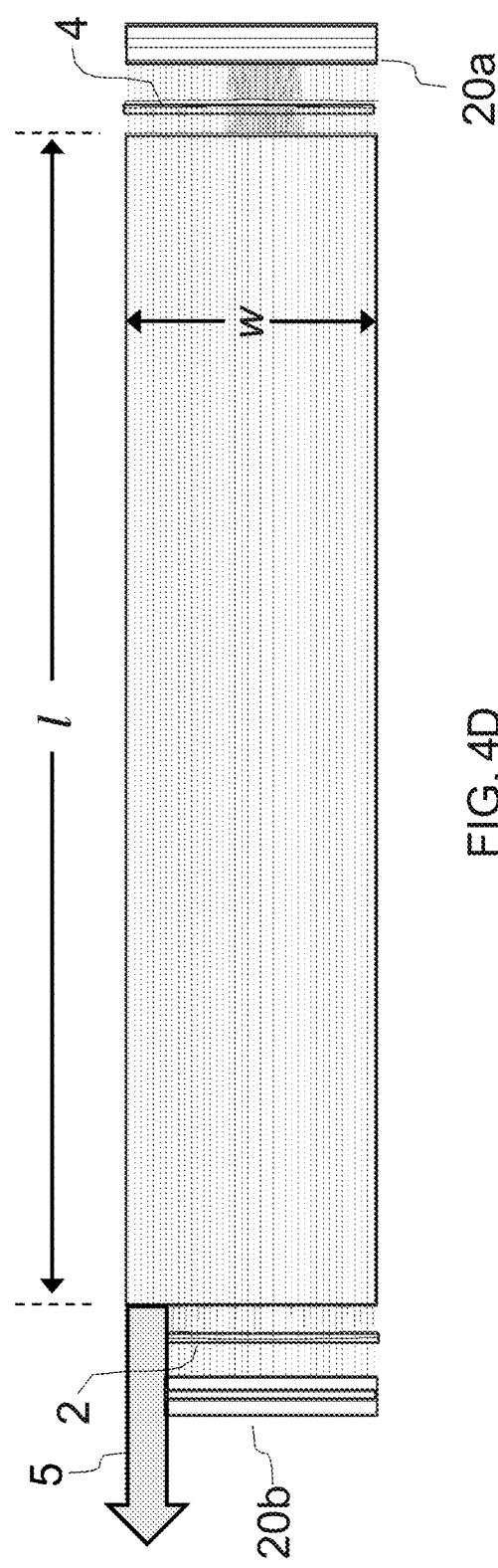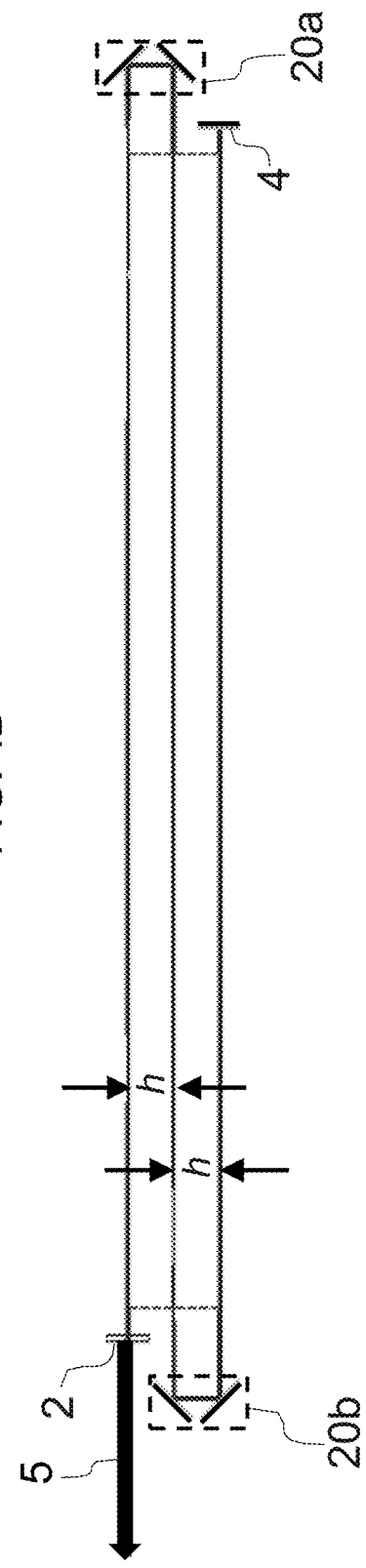

FOLDED SLAB LASER

CROSS-REFERENCE TO RELATED APPLICATIONS

This application is a division of U.S. patent application Ser. No. 16/364,004 filed on 2019 Mar. 25, which claims priority to and the benefit of European Patent Office Application No. 18165802.2 filed 2018 Apr. 4, each of which is incorporated herein by reference in their entireties.

FIELD OF THE INVENTION

The present disclosure relates to a folded slab laser.

BACKGROUND

A folded slab laser is one which has two or more slabs, and the slab ends that are not associated with the cavity mirrors are optically linked by some kind of fold optics so that light emerging from one slab is routed into another of the slabs. Typically, the motivation for a folded design over an equivalent non-folded design with a single slab is to make the laser shorter, with one fold halving the length, two folds reducing the length by three times and so forth.

The slab may form a waveguide. A slab waveguide is a kind of very flat planar waveguide. Specifically, in this document, by slab waveguide we mean a waveguide that, in cross-section orthogonal to the optical axis of the waveguide, has a short dimension and a long dimension, the short dimension being sufficiently short to support waveguide modes in that axis, which we refer to as the vertical axis, and the long dimension being sufficiently long to support free space, unstable resonator modes in that axis, which we refer to as the horizontal axis. The horizontal axis, the vertical axis and the optical axis are each orthogonal to each other. The slab is thus a waveguide in respect of the vertical dimension and an unstable resonator in respect of the horizontal dimension, hence the term of art hybrid waveguide-unstable resonator for this kind of design.

U.S. Pat. No. 5,608,745 A in FIG. 12(B) thereof shows in very general terms a laser resonator comprising multiple slabs which are co-planar and arranged alongside each other with their optical axes extending parallel to each other. Each adjacent slab pair is coupled by a fold mirror assembly to deflect light emitted from one slab of the pair by 180 degrees back into the next slab of the pair.

US 2005/0094697 A1 describes in FIG. 1 thereof a slab waveguide laser design which has two slabs which are coupled with one fold mirror assembly and also another slab waveguide design in FIG. 3 thereof which has three slabs which are coupled with two fold mirror assemblies. In all designs of US 2005/0094697 A1, the slabs are co-planar and arranged alongside each other with their optical axes extending parallel to each other. In the two slab design, the slabs are coupled at one end of the laser with a fold mirror assembly comprising two mirrors arranged at 45 degrees to their respective optical axes so as to deflect light by 180 degrees. At the other end of the laser, respective mirrors are provided for the two slabs to define the laser resonator, namely an output coupler and an end reflector. The three-slab design is an extension of the two-slab design with an additional fold mirror assembly and the output coupler and end reflector arranged at different ends of the laser. Additionally, US 2005/0094697 A1 teaches that the distance between the ends of the slab waveguides and the fold mirrors should be made as small as possible and not exceed a few mm, with values in the range of 3-4 mm being said to have proved suitable in practice.

BRIEF SUMMARY OF THE INVENTION

According to one aspect of the disclosure, there is provided a laser comprising:
  a resonator cavity; and
  a plurality of slab waveguides within the resonator cavity each providing a volume for accommodating a gain medium; and
  at least one cavity folding assembly configured to direct a radiation beam emitted from one of the slab waveguides into another of the slab waveguides,
    wherein the slab waveguides are physically arranged above one another in a stack and optically arranged in series through the or each cavity folding assembly,
    wherein each slab waveguide has a thickness sized to support at least one waveguide mode vertically in the slab waveguide and a width sized to support free space modes horizontally across the slab waveguide, and
    wherein the or each cavity folding assembly is configured to focus the radiation beam emitted from said one of the slab waveguides by an amount selected to couple at least one of the waveguide modes into said other of the slab waveguides.

The cavity folding assembly can thereby counteract the natural divergence of the waveguide modes as they emerge from one of the slab waveguides and couple a selected one or ones of those waveguide modes back into another of the slab waveguides. In particular, the focusing power can be optimized for maximum coupling efficiency of the fundamental lowest-loss waveguide mode, EH11. At least one of the waveguide modes may therefore include an EH11 mode.

The or each or at least one cavity folding assembly can be configured to direct without focus the free space modes emitted from said one waveguide into said other waveguide. For embodiments in which there is focusing of the waveguide modes and no focusing of the free space modes, then the cavity folding assembly effectively constitutes a cylindrical lens or mirror assembly. When the cavity folding assembly is constructed solely with mirrors, then this means that two or more mirrors are used whose combined effect is to provide a cylindrical focus. For example, if two mirrors are used, both may be cylindrical mirrors with half the required focusing power, or one may be planar and the other cylindrical to a degree sufficient to provide all the required focusing power.

In one group of embodiments, the, each or at least one cavity folding assembly has an effective radius of curvature, R, equal to approximately twice the optical path length, Z, of the radiation beam as it traverses the cavity folding assembly during its passage between ones of the slab waveguides. For example, the equality R is approximately twice Z is met to within a range selected from the group: Z/R=0.50±0.05, 0.50±0.10, 0.50±0.15 and 0.50±0.20.

In another group of embodiments, the, each or at least one cavity folding assembly has an effective radius of curvature, R, equal to approximately the optical path length, Z, of the radiation beam as it traverses the cavity folding assembly during its passage between ones of the slab waveguides. For example, the equality R is approximately equal to Z is met to within a range selected from the group: Z/R=1.00±0.05, 1.00±0.10, 1.00±0.15 and 1.00±0.20.

In one group of embodiments, the planes of all the slab waveguides are parallel to one another. In another group of embodiments, at least one of the slab waveguides lies in a plane that is tilted at an acute angle, e.g. less than one of 10, 20 or 30 degrees, relative to at least one other of the slab waveguides. For example, the uppermost and lowermost waveguides of a stack may be horizontal and some or all of the intermediate waveguides tilted.

In the embodiments with adjacent slabs that are parallel, the or each cavity folding assembly coupling those slabs can be configured to redirect the radiation beam through 180 degrees and by a vertical distance corresponding to a vertical offset between the associated slabs which are stacked parallel to each other. Having the slabs stacked parallel to each other will provide the most compact configuration. However, other configurations for stacking of slabs is possible.

In one specific design example, each cavity folding assembly comprises: a first mirror surface portion with a first radius of curvature, R1, and arranged at a horizontal distance, d1, from one of the associated slab waveguides; and a second mirror surface portion with a second radius of curvature, R2, and arranged at a horizontal distance, d2, from the other of the associated slab waveguides, the first and second mirror surface portions being vertically offset by a vertical offset, h, between the associated slab waveguides, wherein the optical path length, Z is the sum of d1, h and d2. In this design, R1 can be set to be equal to or approximately equal to R2 and/or d1 can be set to be equal to or approximately equal to d2 and/or the first and second mirror portions can be configured so that they each reflect light through exactly or approximately 90 degrees.

In some embodiments using mirrors, the first and second mirror surface portions are both curved. In other embodiments, one of the first and second mirror surface portions may be planar, with the other being curved and thereby being the sole contributor to the effective radius of curvature. In the most preferred implementations, both are curved with an equal degree of curvature, or at least approximately equal degree of curvature.

Generally it will be appreciated that for all reflecting and focusing activity in optics, mirror and lens elements are freely substitutable, so that while specific embodiments described in this document are realized with mirrors in principle each specific mirror embodiment will have a lens equivalent. For example a cylindrical lens and planar mirror could be substituted for a cylindrical mirror to achieve the equivalent optical result.

Particular examples are designs with two of said slab waveguides and one of said cavity folding assemblies; three of said slab waveguides and two of said cavity folding assemblies; and four of said slab waveguides and three of said cavity folding assemblies. Generally the design is scalable to any number of vertically offset slab waveguides, wherein the number of cavity folding assemblies will be one fewer than the number of slab waveguides.

The resonator cavity may be bounded by first and second cavity end mirrors. In addition, given that each slab waveguide has first and second ends, there are some embodiments in which one of the slab waveguide ends is associated with the first cavity end mirror, another of the slab waveguide ends is associated with the second cavity end mirror, and the remaining slab waveguide ends are arranged in one or more pairs, each of which is associated with a cavity folding assembly.

The first and second cavity end mirrors and the or each cavity folding assembly can be jointly configured such that the free space modes come to a focus part way along one of the slab waveguides. In particular, the resonator may be configured such that the free space modes come to a focus near the middle, i.e. near midway, along one of the slab waveguides. To achieve this, the laser may be provided with an odd number of the slab waveguides. In other words, the number of slabs is 3, 5, 7 etc. Having an odd plural number of slabs, in particular in combination with cavity folding assemblies that are planar reflectors in respect of the free space modes, should avoid potential issues with hybrid-mode lasers that have even numbers of slabs, which will tend to produce a focus of the free space modes coincident with a fold, i.e. such that the free-space-mode focus occurs near a surface of one of the components of the fold optics assemblies, bearing in mind that the free-space-mode focus will correspond to a maximum in power density and thus have the greatest propensity to cause burn out of a mirror surface or a lens surface.

In some embodiments, the gain medium is a gas and the laser further comprises electrodes which are drivable pairwise in use by a radio frequency, RF, drive voltage to discharge an RF electrical current through the gas. Further, an electrode can be arranged between each slab waveguide, as well as above the uppermost one of the slab waveguides and below the lowermost one of the slab waveguides, such that there is a gap between vertically adjacent electrodes across which the RF electrical current can be discharged through the gas. The electrodes above the uppermost one of the slab waveguides and below the lowermost one of the slab waveguides can then be electrically connected, so that in use they can both be maintained at electrical ground. In one embodiment, the electrode above the uppermost slab waveguide and the electrode below the lowermost slab waveguide are formed by a common, electrically conducting housing.

A gas of particular interest for the gain medium is carbon dioxide. Other gases of interest include any suitable molecular or atomic gases, or mixtures thereof, e.g. carbon monoxide, helium, nitrogen.

According to another aspect of the disclosure, there is provided a laser comprising:

a resonator cavity;

first, second and third beam path passageways within the resonator cavity each providing a volume for accommodating a gaseous gain medium;

first and second cavity folding assemblies, the first cavity folding assembly being configured to direct a radiation beam emitted from the first passageway into the second passageway and the second cavity folding assembly being configured to direct a radiation beam emitted from the second passageway into the third passageway, wherein the beam path passageways are physically arranged above one another and optically arranged in series through the first and second cavity folding assemblies; and a plurality of RF-drive electrodes comprising:

a first electrode arranged above the first beam path passageway;

a second electrode arranged between the first and second beam path passageways;

a third electrode arranged between the second and third beam path passageways; and a fourth electrode arranged below the third beam path passageway.

In some embodiments, the first and fourth electrodes are connected to an electrical ground. The laser may further comprise an RF drive circuit connected to the second and third electrodes and operable to apply: a first RF drive voltage the second electrode; and a second RF drive voltage to the third electrode with a 120 degree phase shift to the first RF drive voltage, so that an equal voltage drop is applied across each of the first, second and third passageways. The first and fourth electrodes may form part of a common, electrically conducting housing. The laser may further comprise an RF drive circuit operable to generate an RF drive voltage and connected to apply the RF drive voltage to the second and third electrodes with the 120 degree phase shift.

The beam path passageways may be waveguides and the waveguides may be slab waveguides. However, the electrode arrangement is not specific to waveguide lasers or slab waveguide lasers, and may be applied to non-waveguide lasers. In one group of embodiments, the slab waveguides are arranged above one another in a stack. In an alternative group of embodiments, the slab waveguides are arranged in a common plane. In some embodiments, the resonator cavity is bounded by first and second cavity end mirrors.

BRIEF DESCRIPTION OF THE DRAWINGS

In the following, the present invention will further be described by way of example only with reference to exemplary embodiments illustrated in the figures.

FIG. 4D is a bottom view of the laser of FIG. 1 with the bottom part of the enclosure 'removed' to show the spatial extent of the diverging wave propagating in the laser cavity.

FIG. 4E is a side view corresponding to FIG. 4D.

DETAILED DESCRIPTION OF THE PREFERRED EMBODIMENTS

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
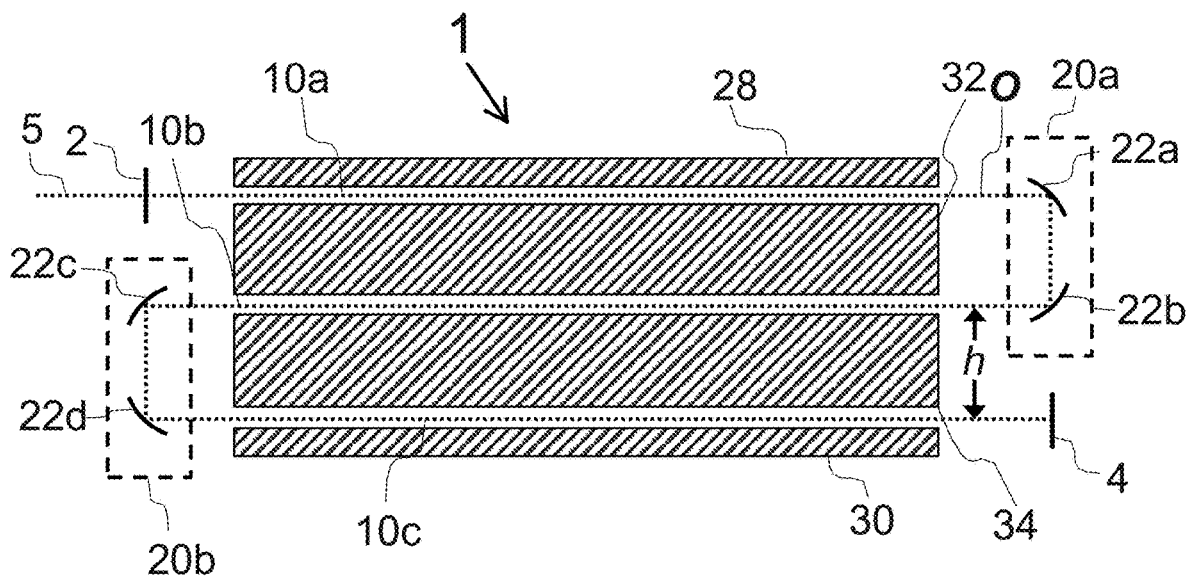
FIG. 1 shows in schematic side sectional view a laser according to an embodiment in which three slab waveguides stacked on top of one another are optically coupled with two fold mirror assemblies.

FIG. 1 shows in schematic side sectional view a laser 1 according to an embodiment of the disclosure, the laser being of the folded slab hybrid waveguide-unstable resonator type. The resonator is based on a resonant cavity bounded by end mirrors 2 and 4, the end mirror 2 being the output coupler and the end mirror 4 the end reflector. The output coupler 2 may be of various forms as known in the art. Three suitable examples of mirror types that can be used as the output coupler in a hybrid waveguide-unstable resonator of the type described herein are:

a. Edge-coupled hard-edge mirror where the intracavity beam is magnified on successive round-trips and overspills the mirror area, thereby producing the output beam.

b. Scraper mirror which is a variant of the edge-coupled hard-edge mirror design in which the output beam "gap" alongside the mirror's knife-edge is filled with a scraper mirror, which can be arranged either in front of or alongside the front mirror.

c. Variable reflectivity mirror with a soft-edge graded reflectivity profile, such as a super-Gaussian tapered reflectivity profile, on a transmissive substrate. This type of output coupler mirror has a low level of intra- and extra-cavity diffraction ripples, which can result in a higher quality output beam.

The laser 1 has three slab waveguides 10a, 10b, 10c are stacked on top of one another, each separated by the same vertical distance 'h'. (The separation 'h' between vertically adjacent slabs can be freely selected, so in other embodiments these may have different values, h1, h2 etc . . . ) The three slab waveguides 10a, 10b, 10c are thus physically arranged in different planes, which are parallel to each other and vertically offset. The slab waveguides are arranged in between and optionally also defined by RF electrodes 28, 30, 32, 34, whose operation is described further below. Each slab waveguide 10a, 10b, 10c has a thickness, i.e. vertical dimension in FIG. 1, sized to support at least one waveguide mode vertically in the slab waveguide and a width, i.e. the dimension out of the paper in FIG. 1, sized to support free space modes horizontally across the slab waveguide. The principal optical axis of the laser is shown with a dotted line and is denoted with reference numeral 'O'. The output beam from the laser 1 is denoted with reference numeral '5'. Each of the slab waveguides provides a volume for accommodating a gain medium, it being envisaged that a gaseous gain medium is used, such as carbon dioxide. However, in principle the same design is suitable for other gain media, such as liquids or solids. The three slab waveguides 10a, 10b, 10c are optically arranged in series through two cavity folding assemblies 20a, 20b. Each cavity folding assembly 20a, 20b is configured to direct a radiation beam emitted from one of the slab waveguides into another of the slab waveguides. The cavity folding assembly 20a has first and second curved mirrors 22a, 22b. Both the first curved mirror 22a and the second curved mirror 22b are configured to deflect an incident beam by 90 degrees, so that the principal optical axis 'O' has horizontal and vertical segments. The cavity folding assembly 20b has a similar design with first and second curved mirrors 22c, 22d.

Figure 2:
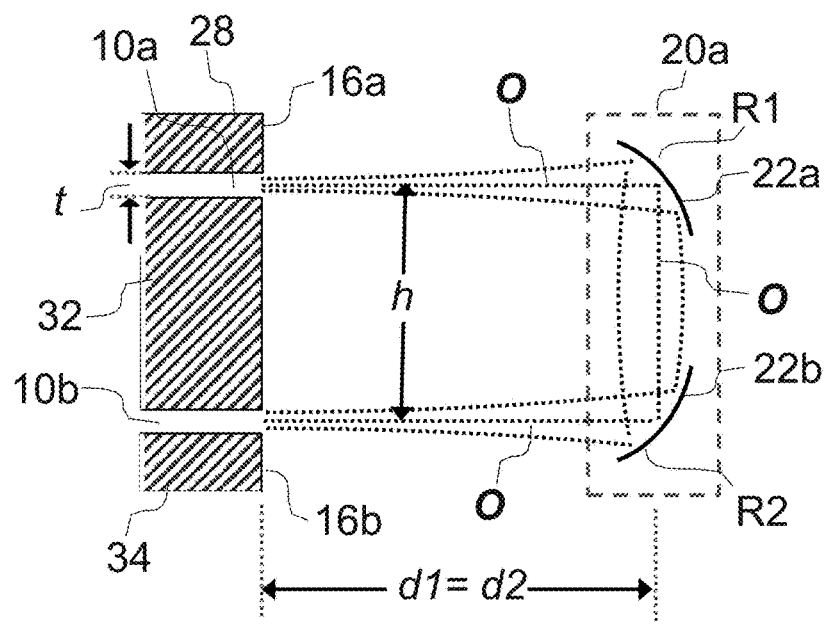
FIG. 2 shows in more detail the optical design around one of the fold mirror assemblies of FIG. 1.

FIG. 2 shows in more detail the optical design around the fold mirror assembly 20a of FIG. 1. It will be understood that the optical design of the other fold mirror assembly 20b follows the same principles. FIG. 2 shows the right-hand end 16a of the slab waveguide 10a, the right-hand end 16b of the slab waveguide 10b and the fold mirror assembly 20a. The slab waveguides 10a, 10b have a vertical thickness 't' which, as mentioned above, is sized to support a single waveguide mode vertically in the slab waveguide, e.g. the EH11 mode, or a discrete defined number of waveguide modes vertically in the slab waveguide, e.g. 2, 3, 4 or 5 modes. The effect of the fold assembly 20a is to subdivide the optical axis O in its section between the two waveguide ends 16a, 16b into two horizontal segments of length d1 and d2 and one vertical segment of length 'h' corresponding to the vertical offset between the planes of the waveguides 10a and 10b. The optical path length 'Z' over the free-space propagation region between the two waveguides is thus Z=d1+h+d2. As will be understood, when the radiation beam leaves the end of one of the slab waveguides it will diverge in the vertical plane, i.e. orthogonal to the plane of the slab. The role of the fold assembly 20a is to focus the divergent radiation beam emitted from the waveguides 10a, 10b by an amount selected to provide good coupling of one or more selected ones of the vertical waveguide modes into the vertically offset waveguide 10b, 10a respectively. The cavity folding assembly 20a thereby counteracts the natural divergence of the vertical waveguide mode(s) as they emerge from the slab waveguides 10a, 10b and couple a selected one or ones of those waveguide modes back into the other slab waveguide 10b, 10a. In particular, the focusing power can be optimized for maximum coupling efficiency of the fundamental lowest-loss waveguide mode, EH11.

The vertical thicknesses 't' of the slab waveguides need not be the same for each slab waveguide and may differ. For example, the vertical thicknesses of the uppermost and/or lowermost slabs could be made greater than for the middle slab(s) to reduce the irradiance (W/cm^2) on the end mirrors. Varying the vertical thicknesses between slabs is also a potential design variable to provide a more highly-discriminating mode-trap in one direction for a particular mode of significance, since it will make the loss and mode discrimination different for the two directions of travel of the beam through the fold.

In respect of the free-space modes, in the present embodiment each cavity folding assembly is configured to direct these modes without focus from one waveguide to the other. (Alternatively, some focusing or defocusing could be provided in respect of the free space modes, which would be an independent effect that is not the subject of the present disclosure, but is nevertheless compatible with the present disclosure.) In the present embodiment in which there is focusing of the (vertical) waveguide modes and no focusing of the (horizontal, out-of-paper in FIG. 1) free space modes, then the cavity folding assembly effectively constitutes a cylindrical mirror assembly, assuming that the focusing is exclusively performed with mirrors. When the cavity folding assembly is constructed with two mirrors 22a, 22b as illustrated, then this means that their combined effect is to provide a cylindrical focus. For example, mirrors 22a, 22b can each be cylindrical mirrors with half the required focusing power. (Alternatively, one of the mirrors may be planar and the other cylindrical to a degree sufficient to provide all the required focusing power.)

Each cavity folding assembly is configured to redirect the radiation beam through 180 degrees and by a vertical distance corresponding to a vertical offset 'h' between the associated slabs which are stacked parallel to each other. Having the slabs stacked parallel to each other as illustrated will provide the most compact configuration.

Returning to FIG. 2, the first mirror 22a has a first radius of curvature, R1 (in the plane of the paper). The first mirror 22a is arranged at a horizontal distance, d1, from the waveguide end 16a. The second mirror 22b has a second radius of curvature, R2 (in the plane of the paper). The second mirror 22b is arranged at a horizontal distance, d2, from the waveguide end 16b. The first and second mirrors 22a, 22b are vertically offset by a vertical offset, h, between the waveguides 10a, 10b, wherein the optical path length, Z is the sum of d1, h and d2. In some embodiments, R1 can be made equal to, or approximately equal to, R2. Moreover, d1 can be made equal to, or approximately equal to, d2. Further, the first and second mirrors 22a, 22b can be configured each to reflect light through 90 degrees (as shown), or approximately 90 degrees.

In some embodiments using mirrors, the first and second mirrors are both curved. In other embodiments, one of the first and second mirrors may be planar, with the other being curved and thereby being the sole contributor to the effective radius of curvature. In the most preferred implementations, both are curved with an equal degree of curvature, or at least approximately equal degree of curvature. The effect of the fold optics is to provide a suitable focusing power to wholly or partially reverse the divergence of the waveguide mode exiting one waveguide upon reflection back into the other waveguide.

Two particular coupling regimes are of special interest for embodiments of the disclosure. These coupling regimes are defined in terms of the ratio of Z/R, i.e. the optical path length 'Z' in free space between the waveguide ends being coupled through a fold and the effective radius of curvature 'R' of the focusing optics. The focusing optics may be a mirror, a lens, a mirror combination, a lens combination or a lens and mirror combination, where the individual elements or the elements collectively may be spherical, parabolic, cylindrical or aspheric.

The first coupling regime of particular interest is the so-called "Case III" coupling regime, for which in our designs each cavity folding assembly will have an effective radius of curvature, R, equal to approximately twice the optical path length, Z. Around this ratio, different embodiments will satisfy the condition that Z/R=0.50±0.05, 0.50±0.10, 0.50±0.15 or 0.50±0.20.

In a 'classic' Case III coupling reflector, i.e. where a single focusing curved mirror reflects directly back into the same waveguide, the focusing mirror has a radius curvature R and is placed at a distance Z=R/2 from the end of the waveguide. This value of R is the optimum for maximum coupling of the fundamental, lowest-loss waveguide mode, EH11, back into the waveguide, while maximizing discrimination against the efficient coupling of higher-order, lower beam quality modes back into the waveguide. The value of R as calculated in "The Waveguide Laser: A Review", J. Degnan, Applied Physics, vol. 11, pp. 1 33, (1976) coincides with $\alpha$=2.415 for circular-bore waveguides and approximately the same for square-bore and slab waveguides, where $\alpha$=$ka^2/R$, where 'a' is the waveguide bore half-width and k=$2\pi/\lambda$, where $\lambda$ is the laser wavelength. The various relations are therefore as follows:

$Z = d1 + h + d2$ $R_3 = Z/2$ $R_3 = \cos(45°) R1 \times R2/(R1+R2)$

CASE III:

$d1 = d2 = (R_3/2 - h)/2$ $R_3 = ka^2/\alpha_{III}$ $k = 2\pi/\lambda$ $\alpha_{III} = 2.415$ For example, with a bore size 2a=1.75 mm at a laser wavelength λ=10.6 μm the radius of curvature R is 188 mm, placed a distance 94 mm from the end of the waveguide. However, if the intent is to couple a waveguide mode in the Case III configuration from one waveguide to another above or below using a roof-top mirror assembly like the one shown in FIG. 1, then the focusing power of R can be shared by two mirrors with equal radii of curvature, R1=R2=2R/cos 45°. For the example above with R1=R2=532 mm and in order to maintain the equivalent spacing of 94 mm from the waveguide to the mirror, for a height, h=30 mm between waveguides, the roof-top mirror elements should be placed at the following distance away from the waveguide ends, d1=d2=(R/2−h)/2=32 mm.

The second coupling regime of particular interest is the so-called "Case II" coupling regime, for which in our designs each cavity folding assembly will have an effective radius of curvature, R, equal to approximately the optical path length, Z, of the radiation beam as it traverses the cavity folding assembly during its passage between ones of the slab waveguides.

With optimization for either Case III or Case II, the laser may be designed with a particular Z/R in mind, e.g. 0.5 or 1.0 respectively, and then as part of testing after manufacture Z/R may be varied incrementally around the design value to arrive empirically at an optimum performance condition taking account of factors such as good rejection of unwanted modes as well as good coupling of wanted modes.

The coupling regimes of Case II and Case III, and also Case I, are further discussed in "Finite-Aperture Waveguide-Laser Resonators", J. J. Degnan and D. R. Hall, IEEE J. Quantum Electron. QE-9, 901 (1973), the contents of which is incorporated herein by reference.

Generally it will be appreciated that for all reflecting and focusing activity in optics, mirror and lens elements are freely substitutable, so that while specific embodiments described in this document are realized with mirrors in principle each specific mirror embodiment will have a lens equivalent. For example a cylindrical lens and planar mirror could be substituted for a cylindrical mirror to achieve the equivalent optical result.

Figure 3:
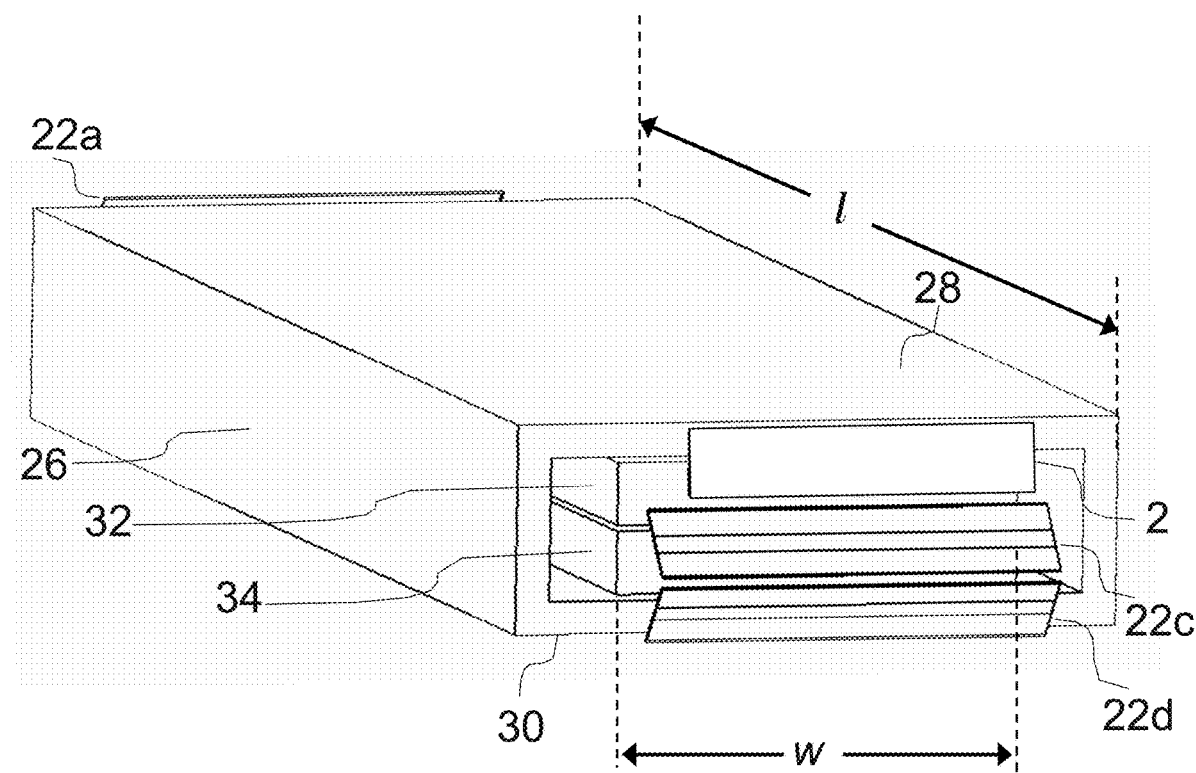
FIG. 3 is a schematic perspective construction drawing of the laser of FIG. 1.

FIG. 3 is a schematic perspective construction drawing of the laser of FIG. 1. The same reference numerals are used as previously for the optical components, with the output coupler mirror 2, part of the fold mirror 22a and fold mirrors 22c and 22d being visible. In addition, the laser enclosure 26 is visible which is essentially a metal (or metallic) box or housing that represents electrical ground. The enclosure 26 has an upper plate 28 which acts as an upper, ground RF electrode, and a lower plate 30, which acts as a lower, ground RF electrode. Also visible are upper and lower internal electrodes 32 and 34 arranged within the enclosure 26 which each in use receive a drive voltage to discharge an RF electrical current across the vertical gaps between the electrodes, these vertical gaps being the previously mentioned vertical gaps of thickness 't' defining the vertical, mode-confining dimension of the hybrid slab waveguides 10a, 10b, 10c. The electrodes 32, 34 define the waveguides 10a, 10b, 10c and their dimensions in width 'w', height 't' and length 'l'. The electrical design is discussed in more detail further below. Before that, we discuss the optical design in more detail.

As will be understood a slab waveguide of the one-sided negative-branch hybrid-unstable type has different waves propagating in each direction in respect of the free-space modes that exist across the slab width, namely a converging wave and a diverging wave. The properties of these converging and diverging waves are now described in more detail.

From a geometric optics beam propagation resonator model, the confocal unstable resonator intracavity mode is comprised of a diverging wave that becomes a plane wave after reflecting off the rear mirror, extending the full width of the mirror equaling the width of the waveguide slab, then propagating along the optical axis towards the front mirror. For the one-sided unstable resonator, a portion of this plane wave exits the resonator in the gap between one extreme of the slab width on one side and the edge of the front mirror, thus forming the top-hat intensity profile near-collimated laser output beam. The remainder of the plane wave incident on the output mirror between the output edge and the other extreme of the slab width forms a converging wave upon reflection. For the negative-branch unstable resonator the converging wave comes to a focus at the confocal point in-between the rear and front resonator mirrors. After passing through the focus the converging wave becomes the diverging wave and propagates along the optical axis to the rear mirror, thus completing the resonator round-trip. Once the output edge diffraction effects are incorporated into the beam propagation resonator model, the intracavity resonator mode and the nominally top-hat intensity output mode are modified to include non-uniform intensity profiles and non-planar or non-spherical phase fronts. For hybrid unstable-waveguide resonators, the free-space resonator modes supported in the slab width dimension are predominantly determined by the curvatures of the end mirrors along the width dimension, while the resonator mode in the slab height dimension is limited to a combination of waveguide modes, typically predominantly the fundamental EH11 resonator mode plus several higher-order waveguide modes. While the unstable resonator free-space beam intensity and phase information is propagated directly from the rear resonator mirror to the front resonator mirror in the slab width dimension, in the slab height dimension the end mirrors and fold mirrors couple resonator mode light to their respective waveguide ends but do not control or impress a phase-front curvature on the waveguide modes directly. Outside of the waveguide slab in-between the end of the waveguide and the waveguide end mirrors and in-between the end of the waveguide and the fold mirrors; the waveguide modes couple into free-space modes and then back into waveguide modes upon reentering the waveguide and the adjacent waveguide, respectively.

Figure 4A:
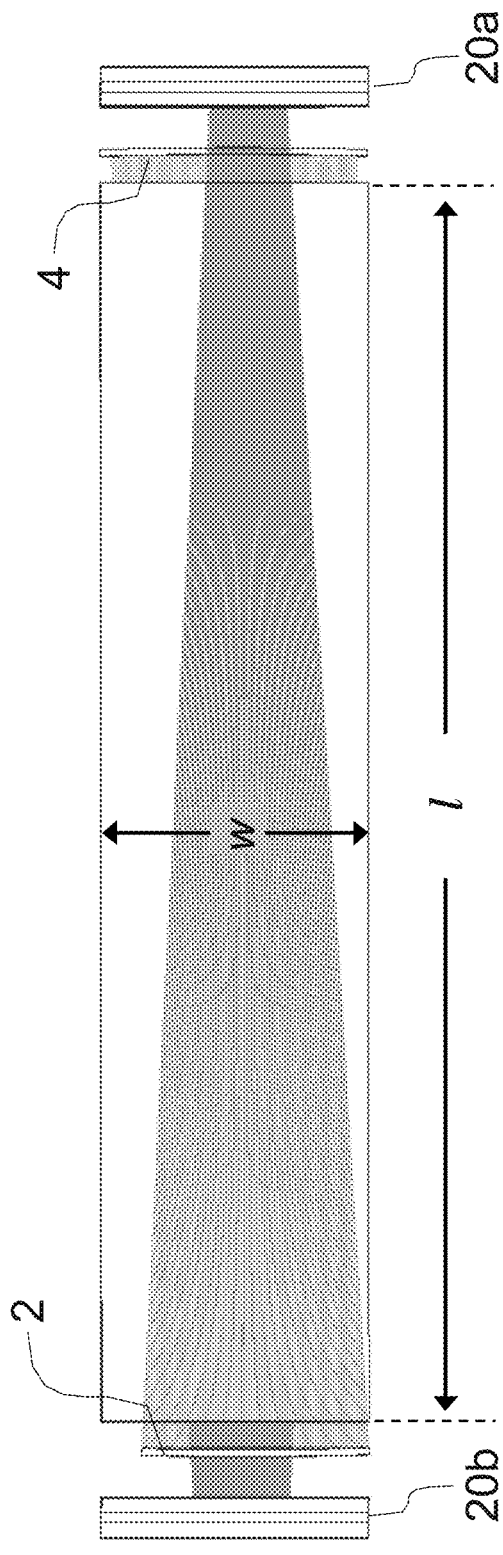
FIG. 4A is a top view of the laser of FIG. 1 with the top part of the enclosure 'removed' to show the spatial extent of the converging wave propagating in the laser cavity.
Figure 4B:
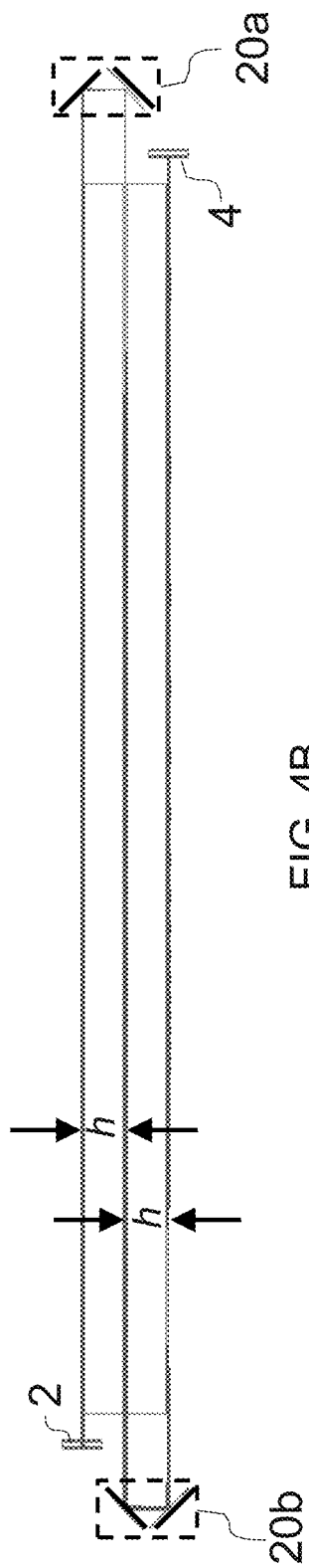
FIG. 4B is a side view corresponding to FIG. 4A.
Figure 4C:
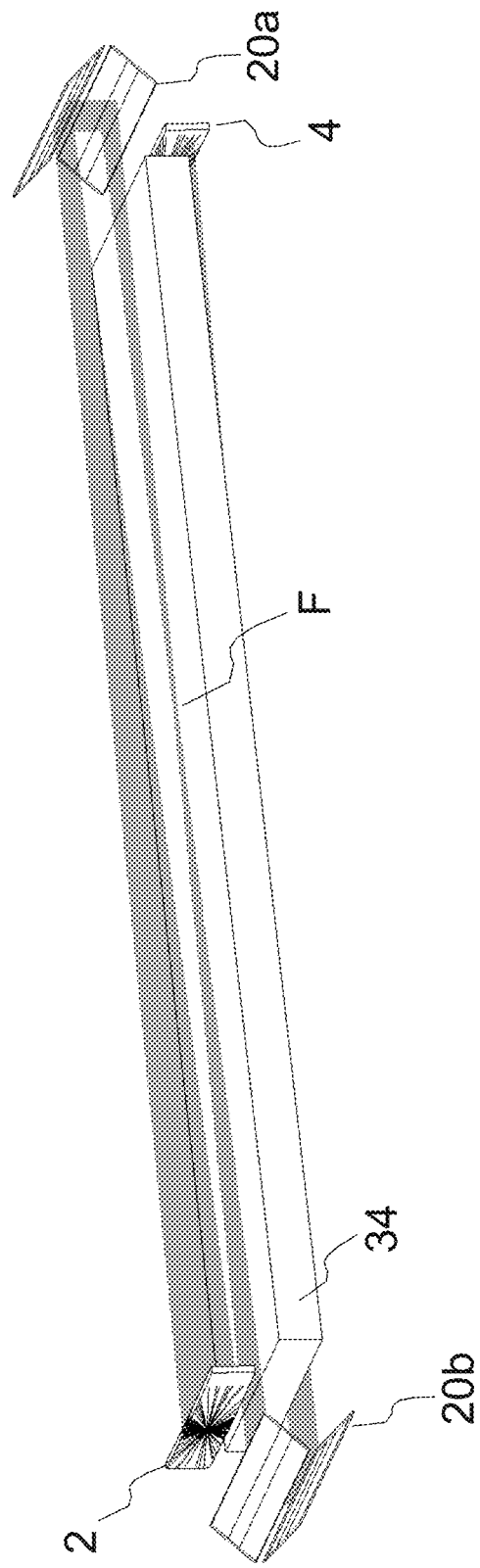
FIG. 4C is a perspective view corresponding to FIG. 4A with the enclosure and also the upper electrode 'removed', i.e. made invisible in the drawing.

FIGS. 4A, 4B and 4C are top, side and perspective views of the laser of FIG. 1. In FIG. 4A, the top part of the enclosure is 'removed' to make visible the spatial extent of the converging wave. FIG. 4B is a side view shown for reference. FIG. 4C is a perspective view with the enclosure and the upper electrode 'removed', i.e. made invisible. Referring to FIG. 4A, in the uppermost waveguide, the converging mode fills the full width of the output coupler 2 at the left-hand end of the upper waveguide 10a and then tapers to fill perhaps only a quarter of the width of the upper fold mirror assembly 20a. Referring now to FIG. 4C, the converging wave tapers further after leaving the fold assembly 20a and reaches a focus 'F' approximately half way along the middle waveguide 10b. By the time the converging wave reaches the fold assembly 20b it has a width similar to that at the fold assembly 20a. In the lower waveguide 10c, the converging wave then becomes increasingly wider from left to right and fills approximately the full width of the end reflector 4 as can be seen on the right-hand side of both FIG. 4A and FIG. 4C.

FIGS. 4D and 4E are bottom and side views of the laser of FIG. 1. In FIG. 4D, the bottom part of the enclosure is 'removed' to show the spatial extent of the diverging wave propagating in the laser cavity. As can be seen the diverging wave fills the whole width of each of the waveguides 10a, 10b, 10c. From these figures, the output beam 5 can also be seen as it emerges from one side of the output coupler which by way of example is shown as a hard-edge mirror.

What is shown for the focus of the converging wave approximately mid-way along the middle waveguide is a specific example of a desirable feature. Expressed more generally this feature is that the end cavity mirrors and the cavity folding assemblies are jointly configured such that the free space modes come to a focus part way along one of the slab waveguides. In particular, the resonator may be configured such that the free space modes come to a focus near the middle, i.e. near midway, along one of the slab waveguides. One natural way to achieve this is to have an odd number of the slab waveguides. In other words, the number of slabs is 3, 5, 7 etc. Having an odd plural number of slabs, in particular in combination with cavity folding assemblies that are planar reflectors in respect of the free space modes, should avoid potential issues with hybrid-mode lasers that have even numbers of slabs, which will tend to produce a focus of the free space modes coincident with a fold, i.e. such that the free-space-mode focus occurs near a surface of one of the components of the fold optics assemblies, bearing in mind that the free-space-mode focus will correspond to a maximum in power density and thus have the greatest propensity to cause burn out of a mirror surface or a lens surface.

Figure 5:
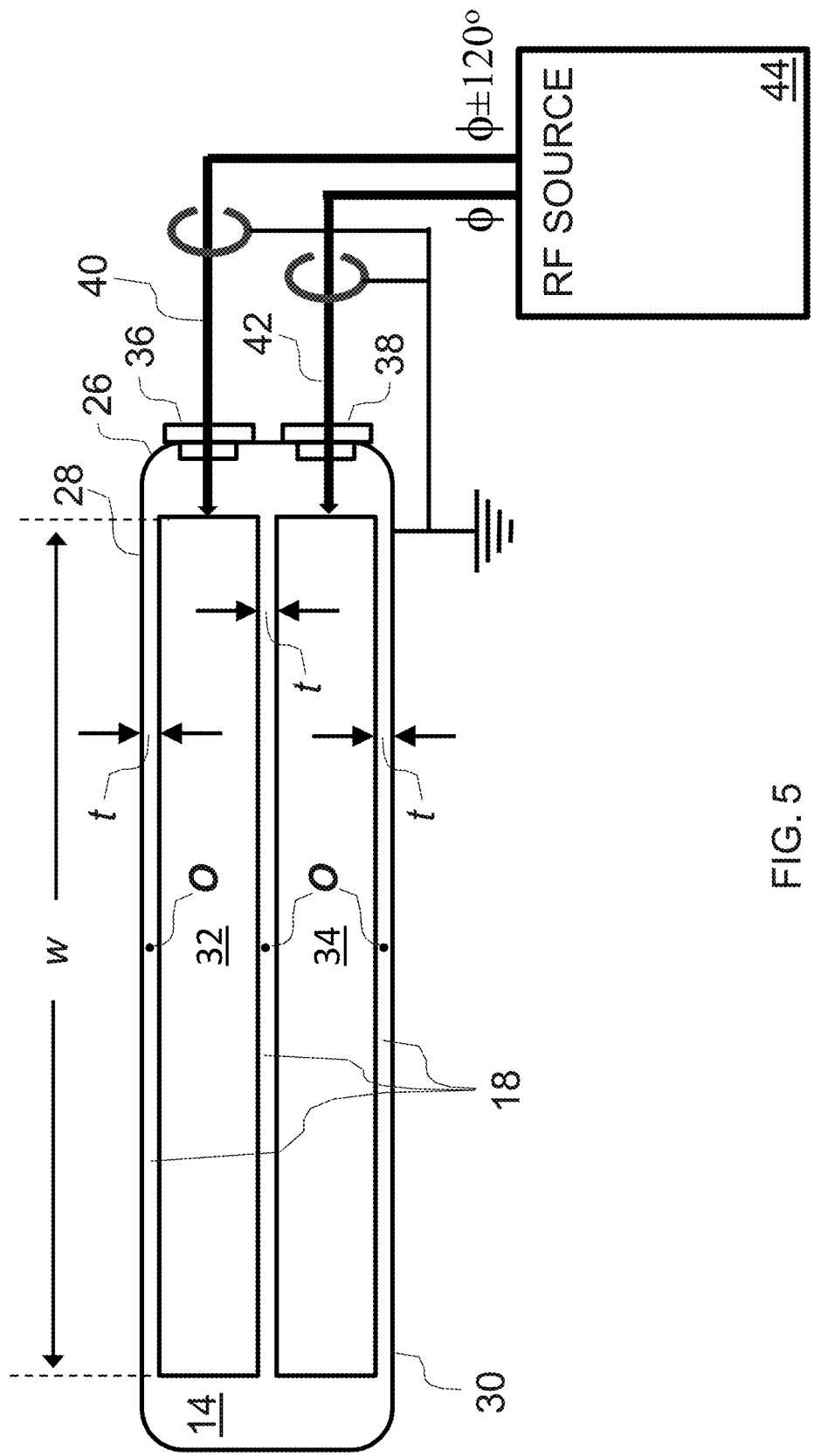
FIG. 5 is a schematic end sectional view of the laser of FIG. 1 showing electrical design features.

FIG. 5 is a schematic end sectional view of the laser of FIG. 1 showing electrical design features. The laser enclosure 26 forms the outer casing of the device with its upper and lower plates 28 and 30 which form the upper and lower ground electrodes. The internal, non-grounded, upper and lower electrodes 32 and 34 of width 'w' are accommodated within the enclosure 26. The enclosure 26 also provides an enclosed volume 14 for containing a gaseous gain medium. The whole of the enclosure 26 may be filled with the gas, or the enclosure may have internal design to confine or concentrate the gas in the waveguides, i.e. between the electrodes where the discharge will take place. The gap of thickness 't' between the upper enclosure plate 28 and upper internal electrode 32 form the upper waveguide 10a and at the same time the discharge gap across which the RF current will excite the gain medium for population inversion. The gap of thickness 't' between the upper internal electrode 32 and the lower internal electrode 34 form the middle waveguide 10b and at the same time its discharge gap. The gap of thickness 't' between the lower internal electrode 34 and the lower enclosure plate 30 form the lower waveguide 10c and at the same time its discharge gap. The electrodes are thus arranged so that they are drivable pairwise in use by a radio frequency, RF, drive voltage to discharge an RF electrical current through the gas across each of the upper, middle and lower waveguides 10a, 10b, 10c. Moreover, it will be understood that the gaps also form the beam path passageways.

The enclosure 26 and thus its upper and lower plates 28, 30 forming the ground electrodes are connected to an electrical ground, or constitute the electrical ground. The internal electrodes 32, 34 are connected to an RF drive circuit via respective RF supply lines 40, 42 which are fed through into the enclosure 26 through respective flanges 36 and 38. The RF supply lines 40, 42 are shielded with shields connected to ground as schematically illustrated, e.g. they are coaxial cables. The RF supply lines 40, 42 are driven offset from each other in phase by 120 degrees by a suitable RF source 44. The 120 degree phase shift between the RF voltages results in equal voltage drops of V/3 across each of the three slab waveguide discharge channels, where V is the supply voltage of the RF source 44.

Figure 6:
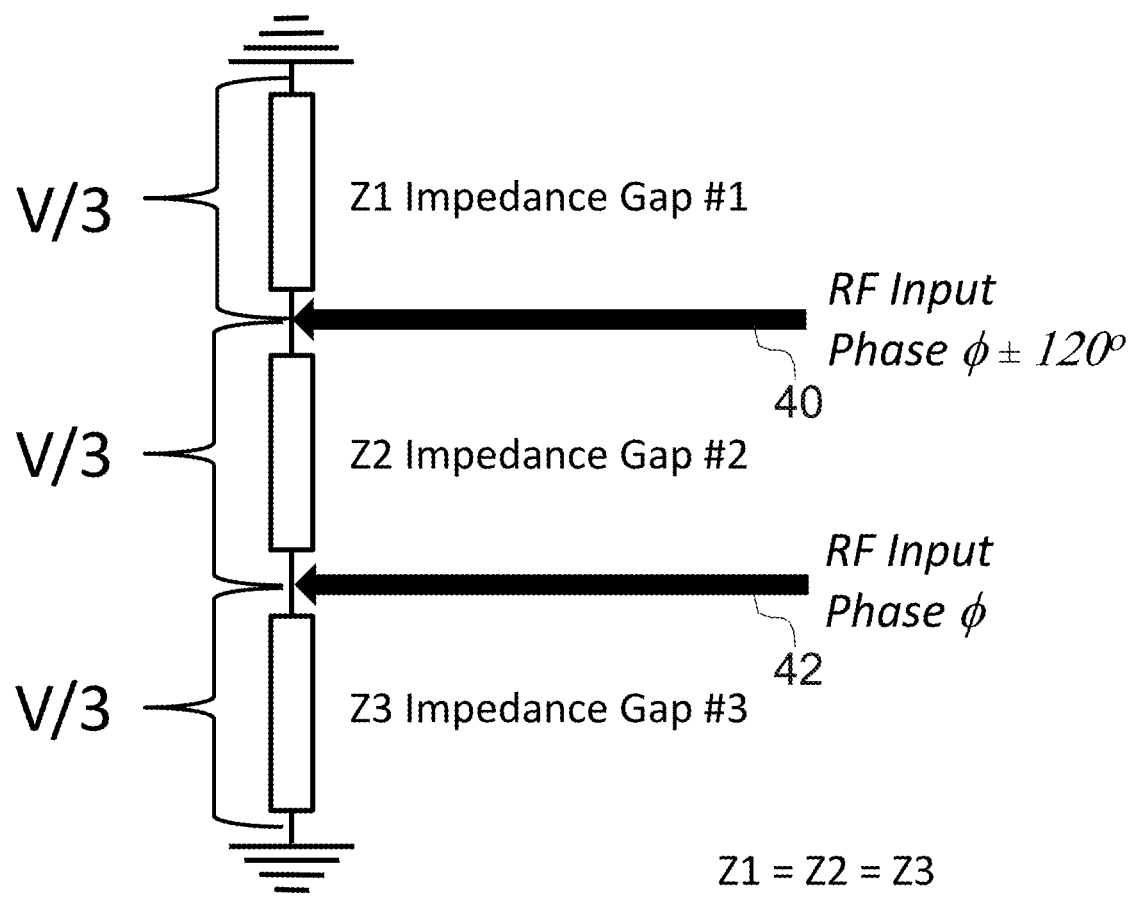
FIG. 6 is a schematic circuit diagram of the RF drive of the laser of FIG. 1.

FIG. 6 is a schematic circuit diagram of the RF drive of the laser of FIG. 1 showing how the gaps #1, #2, #3 across waveguides 10a, 10b and 10c between the respective electrode pairs 28/32, 32/34 and 34/30 have equal impedance which results in the equal voltage drop V/3.

Typically when a gas discharge is excited between two opposing electrodes in an unbalanced fashion, one ground electrode is at ground potential while the other RF electrode is at an elevated RF voltage, V; thus the voltage V also appears between the RF electrode and other grounded fixtures in the vicinity. This can be problematic when the grounded fixtures, such as the gas envelope enclosure, resonator and fold mirrors can be damaged by a gas discharge that can occur between it and the RF electrode. Also, any unwanted gas discharges outside of the gap in-between the opposing electrodes do not contribute to the laser output power and detract from the RF-to-optical conversion efficiency.

When a gas discharge is excited between two opposing electrodes in a balanced fashion, with RF voltages applied to the electrodes out of phase, then the voltages between each electrode and grounded fixtures in the vicinity can be reduced significantly. For example, for two electrodes excited 180-degrees out of phase as described in U.S. Pat. No. 6,137,818, the voltage between each electrode to ground is halved. Extending from this idea, significant voltage-to-ground voltage reductions can be achieved by exciting a plurality of pairs of electrodes sharing common electrodes with RF voltages phased at appropriate fractions of the full 360-degrees unbalanced condition.

In some embodiments, the gain medium is a gas. A gas of particular interest is carbon dioxide. Other gases of interest include any suitable molecular or atomic gases, or mixtures thereof, e.g. carbon monoxide, helium, nitrogen. Further, it will be understood that some lasers, in particular gas lasers, are sealed units supplied with the gain medium, e.g. gas, encapsulated in the laser as part of the product as shipped to the customer, whereas other lasers, in particular gas lasers, are shipped without the gain medium. Namely, with a gas laser, the laser may be shipped without the gas and the customer introduces the gas at the time of use, e.g. with appropriate plumbing and gas supply lines. The claims should therefore be understood as not necessarily including the gain medium, but rather only to mean that the waveguides provide a suitable volume for accommodating a gain medium which may or may not form part of the laser unit when not being prepared in use.

The embodiment described above has three slab waveguides and two cavity folding assemblies. More generally the design is scalable to any number of vertically offset slab waveguides. The smallest number of waveguides and folds with the present design is two waveguides and one fold.

Figure 7:
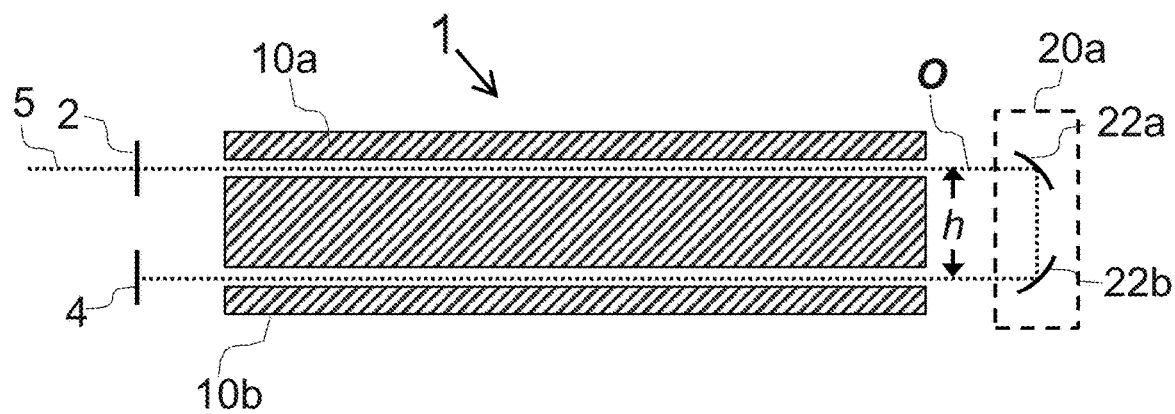
FIG. 7 is a schematic side sectional view a laser with one fold according to an alternative embodiment.

FIG. 7 is a schematic side sectional view of such an embodiment with two slab waveguides and one fold. Reference numerals correspond to those used in the first embodiment.

Figure 8:
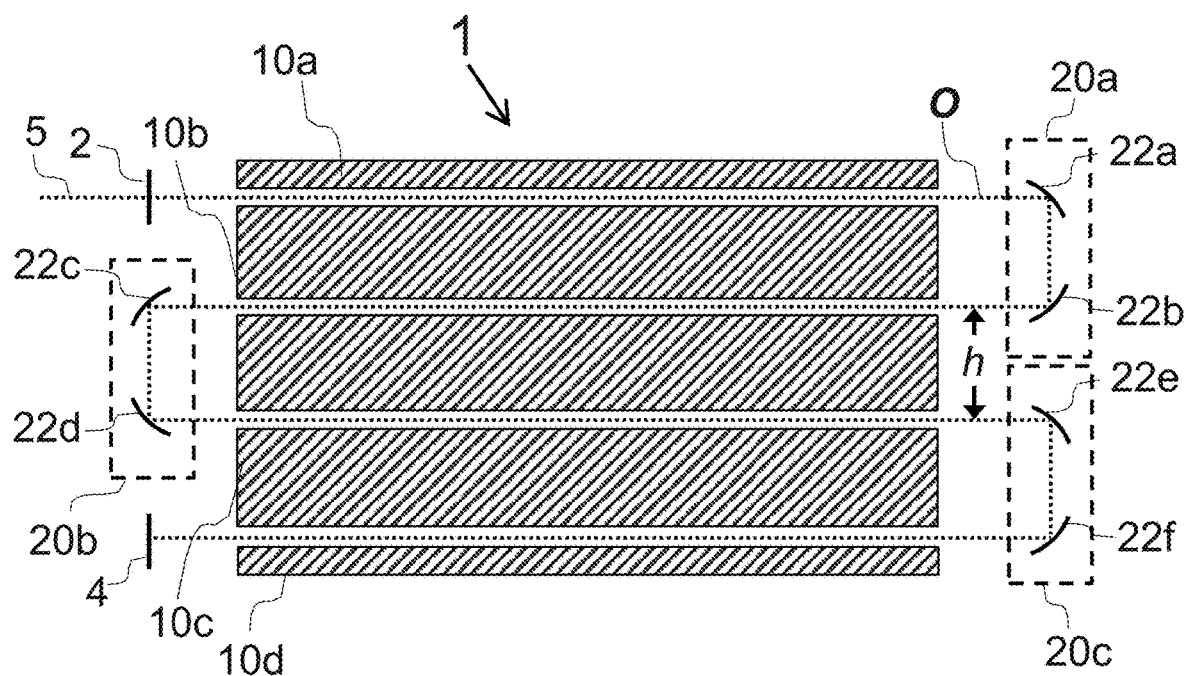
FIG. 8 is a schematic side sectional view a laser with three folds according to a further alternative embodiment.

FIG. 8 is a schematic side sectional view a laser with four slab waveguides and three folds according to a further alternative embodiment. Reference numerals correspond to those used in the first embodiment.

Figure 9:
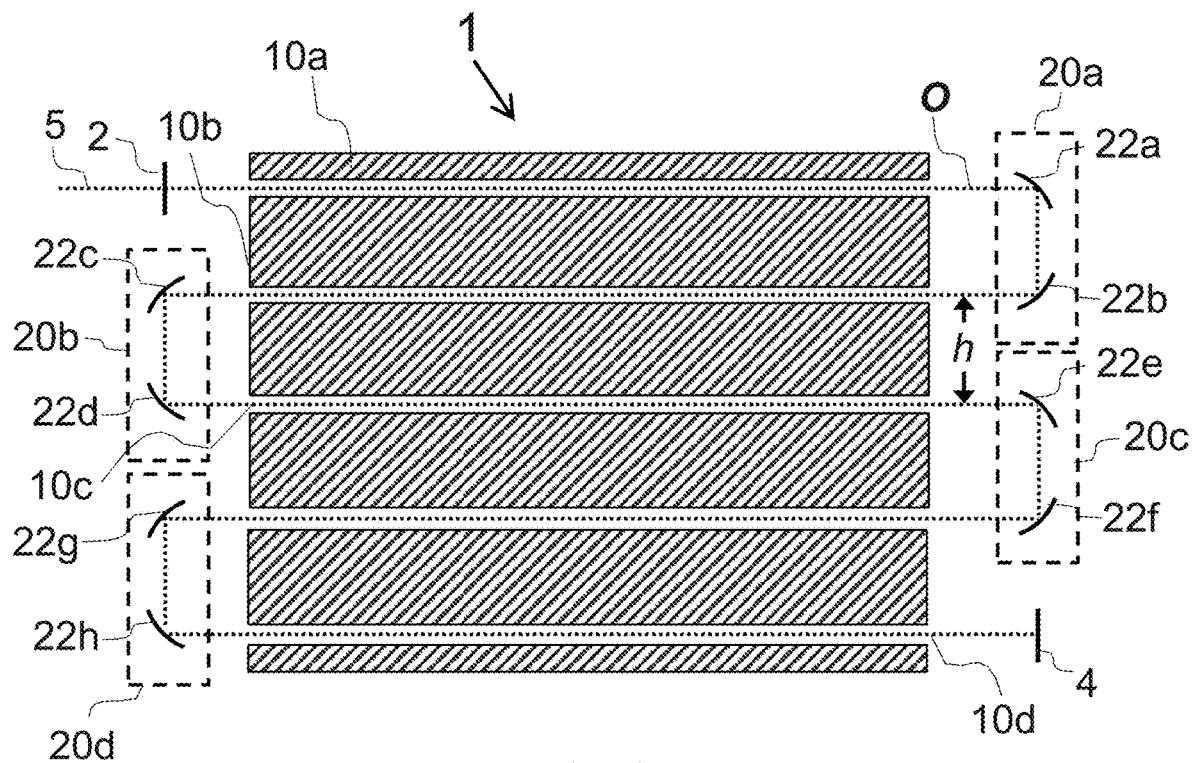
FIG. 9 is a schematic side sectional view a laser with four folds according to a further alternative embodiment.

FIG. 9 is a schematic side sectional view a laser with five slab waveguides and four folds according to a further alternative embodiment. Reference numerals correspond to those used in the first embodiment.

Further embodiments can be contemplated with still larger numbers of slab waveguides and cavity folding assemblies. It will be understood that the design is scalable to any number of vertically offset slab waveguides, wherein the number of cavity folding assemblies will be one fewer than the number of slab waveguides.

Figure 10:
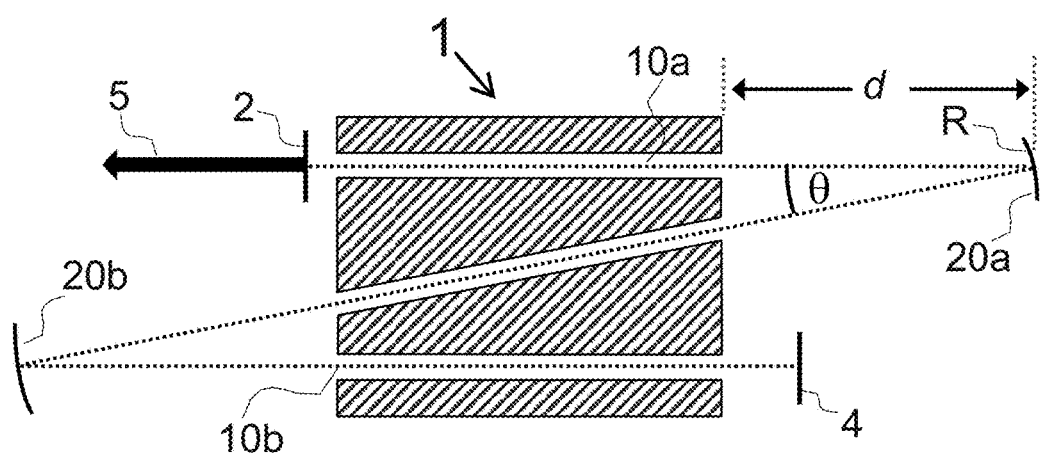
FIG. 10 shows in schematic side sectional view a laser according to an embodiment with a z-fold in which three slab waveguides are stacked on top of one another with the middle slab tilted at an angle θ in relation to the upper and lower slabs.

FIG. 10 shows in schematic side sectional view a laser according to an embodiment with a z-fold in which three slab waveguides are stacked on top of one another with the middle slab tilted at an angle in relation to the upper and lower slabs. The embodiment of FIG. 10 is a three slab stack in a z-shaped arrangement with the two cavity folding assemblies redirecting the radiation beam by somewhat less than 180 degrees, i.e. 180–θ, where e.g. 5≤θ≤45 to give a redirection angle of between 135 to 175 degrees. The various relations are therefore as follows:

CASE II (for Small θ)

$$d \sim R$$

$$R = ka^2/\alpha_{II}$$

$$k = 2\pi/\lambda$$

$$\alpha_{II} = 0.593$$

A particular example would be λ=10.6 μm and 2a=1.75 mm which gives R=d=765 mm. Embodiments with Case II are likely to be more practically sized in typical size laser enclosures for small waveguide heights with corresponding small R and small d, i.e. small 'a', since R scales with $a^2$. For the example above with 2a=0.875 mm, R becomes 191 mm; which is similar to the value of R for Case III which is 188 mm for 2a=1.75 mm.

Another related example with tilted slabs is a four slab stack in a capital epsilon arrangement, Σ, with three cavity folding assemblies two of which redirect the beam by 180–n degrees and one of which by 180–2n degrees, where 'n' is e.g. between 5 and 45 degrees.

The z-fold or epsilon-fold arrangement of these embodiments is a less compact configuration than in the previously described embodiments that have all the slabs stacked parallel to each other, since it leads to a thicker laser module in the vertical direction. However, tilting the intermediate slab(s) makes it possible to simplify the fold assemblies, so that a single reflector can be used for each fold assembly. In other words, with a z- or epsilon-type of arrangement, a single mirror can be used to effect each fold, as shown in FIG. 10, rather than a pair of mirrors as shown in the earlier embodiments, i.e. so-called apex reflectors can be used instead of so-called roof-top reflectors.

Another set of variants on the above designs are those which mix Case II and Case III fold assemblies. Any combination of Case II and Case III fold assemblies is possible, since the coupling between adjacent waveguides at any one fold is independent of the coupling at any other fold. Typically a Case III coupling will have a better mode discrimination than Case II to favor the EH11 mode over higher-order modes. However, if a greater distance, d, is needed in the fold, for example to provide sufficient space to accommodate an additional intracavity component, such as an electro-optical Q-switch, then a Case II coupling will provide a greater distance, d, than a Case III coupling (ceteris paribus—i.e. for the same slab waveguide height and laser wavelength). Also, compared with a Case III fold, the greater fold path distances achieved with a Case II fold results in a longer resonator length, L, which provides for better power stability through the thermally-induced laser power signature, which has a c/2L, where 'c' is the speed of light, axial mode frequency spacing sweep over the laser gain profile.

REFERENCE NUMERALS 1 laser
2 output coupler mirror
4 end reflector mirror
5 output laser beam
10a, 10b, 10c . . . slab waveguides
12a, 12b, 12c . . . slab waveguide planes
14 gain medium volume
16a, 16b . . . slab waveguide ends
18 beam path passageway accommodating gaseous gain medium & slab waveguide discharge gap
20a, 20b . . . cavity fold assembly
22a, 22b . . . cavity fold mirrors
26 laser enclosure (ground RF electrodes)
28, 30 upper and lower enclosure plates (upper and lower ground electrodes)
32, 34 intermediate RF electrodes A & B
36, 38 RF lead flanges
40, 42 RF drive leads
44 RF source
Z optical path length in free space between waveguide ends
R effective radius of curvature of cavity fold assembly
h slab waveguide z-separation
t slab waveguide thickness
l slab waveguide length
w slab waveguide width
O principal optical axis (beam path)

It will be clear to one skilled in the art that many improvements and modifications can be made to the foregoing exemplary embodiment without departing from the scope of the present disclosure.

The following numbered clauses relate to further aspects of the disclosure.

1. A laser comprising:
   a resonator cavity; and
   a plurality of slab waveguides within the resonator cavity each providing a volume for accommodating a gain medium; and
   at least one cavity folding assembly configured to direct a radiation beam emitted from one of the slab waveguides into another of the slab waveguides,
   wherein the slab waveguides are physically arranged above one another in a stack and optically arranged in series through the or each cavity folding assembly,
   wherein each slab waveguide has a thickness sized to support at least one waveguide mode vertically in the slab waveguide and a width sized to support free space modes horizontally across the slab waveguide, and
   wherein the or each cavity folding assembly is configured to focus the radiation beam emitted from said one of the slab waveguides by an amount selected to couple at least one of the waveguide modes into said other of the slab waveguides.

2. The laser of clause 1, wherein said at least one of the waveguide modes includes an EH11 mode.

3. The laser of clause 1, wherein the or each or at least one cavity folding assembly is configured to direct without focus the free space modes emitted from said one waveguide into said other waveguide.

4. The laser of clause 1, wherein the or each or at least one cavity folding assembly has an effective radius of curvature, R, equal to approximately twice the optical path length, Z, of the radiation beam as it traverses the cavity folding assembly during its passage between ones of the slab waveguides.

5. The laser of clause 4, wherein the equality R is approximately twice Z is met to within a range selected from the group: $Z/R=0.50\pm0.05$, $0.50\pm0.10$, $0.50\pm0.15$ and $0.50\pm0.20$.

6. The laser of clause 1, wherein the or each or at least one cavity folding assembly has an effective radius of curvature, R, equal to approximately the optical path length, Z, of the radiation beam as it traverses the cavity folding assembly during its passage between ones of the slab waveguides.

7. The laser of clause 6, wherein the equality R is approximately equal to Z is met to within a range selected from the group: $Z/R=1.00\pm0.05$, $1.00\pm0.10$, $1.00\pm0.15$ and $1.00\pm0.20$.

8. The laser of clause 1, wherein the planes of the slab waveguides are all parallel to one another.

9. The laser of clause 1, wherein at least one of the slab waveguides lies in a plane that is tilted at an acute angle relative to at least one other of the slab waveguides.

10. The laser of clause 8 or 9, wherein at least one of the cavity folding assemblies is configured to redirect the radiation beam through 180 degrees and by a vertical distance corresponding to a vertical offset between the associated slabs which are stacked parallel to each other.

11. The laser of clause 10, wherein each said 180-degree redirecting cavity folding assembly comprises:
    a first mirror surface portion with a first radius of curvature, R1, and arranged at a horizontal distance, d1, from one of the associated slab waveguides; and
    a second mirror surface portion with a second radius of curvature, R2, and arranged at a horizontal distance, d2, from the other of the associated slab waveguides,
    the first and second mirror surface portions being vertically offset by a vertical offset, h, between the associated slab waveguides,
    wherein the optical path length, Z is the sum of d1, h and d2.

12. The laser of clause 11, wherein R1 is approximately equal to R2.

13. The laser of clause 12, wherein d1 is approximately equal to d2 and the first and second mirror portions each reflect light through approximately 90 degrees.

14. The laser of clause 1, wherein there are two of said slab waveguides and one of said cavity folding assemblies.

15. The laser of clause 1, wherein there are three of said slab waveguides and two of said cavity folding assemblies.

16. The laser of clause 1, wherein there are four of said slab waveguides and three of said cavity folding assemblies.

17. The laser of clause 1, wherein the resonator cavity is bounded by first and second cavity end mirrors.

18. The laser of clause 17, wherein each slab waveguide has first and second ends, wherein
    one of the slab waveguide ends is associated with the first cavity end mirror,
    another of the slab waveguide ends is associated with the second cavity end mirror, and
    the remaining slab waveguide ends are arranged in one or more pairs, each of which is associated with one of said cavity folding assemblies.

19. The laser of clause 17, wherein the first and second cavity end mirrors and the or each cavity folding assembly are jointly configured such that the free space modes come to a focus part way along one of the slab waveguides.

20. The laser of clause 19, wherein there is an odd number of the slab waveguides.

21. The laser of clause 1, wherein the gain medium is a gas and the laser further comprises electrodes which are drivable pairwise in use by a radio frequency, RF, drive voltage to discharge an RF electrical current through the gas.

22. The laser of clause 21, wherein an electrode is arranged between each slab waveguide, as well as above the uppermost one of the slab waveguides and below the lowermost one of the slab waveguides, such that there is a gap between vertically adjacent electrodes across which the RF electrical current can be discharged through the gas.

23. The laser of clause 22, wherein the electrodes above the uppermost one of the slab waveguides and below the lowermost one of the slab waveguides are electrically connected, so that in use they can both be maintained at electrical ground.

24. The laser of clause 21, wherein the gas is carbon dioxide.

The following numbered clauses relate to still further aspects of the disclosure.

1. A laser comprising:
    a resonator cavity;
    first, second and third beam path passageways within the resonator cavity each providing a volume for accommodating a gaseous gain medium;
    first and second cavity folding assemblies, the first cavity folding assembly being configured to direct a radiation beam emitted from the first passageway into the second passageway and the second cavity folding assembly being configured to direct a radiation beam emitted from the second passageway into the third passageway, wherein the beam path passageways are physically arranged above one another and optically arranged in series through the first and second cavity folding assemblies; and
    a plurality of RF-drive electrodes comprising:
    a first electrode arranged above the first beam path passageway;
    a second electrode arranged between the first and second beam path passageways;
    a third electrode arranged between the second and third beam path passageways; and
    a fourth electrode arranged below the third beam path passageway.

2. The laser of clause 1, wherein the first and fourth electrodes are connected to an electrical ground and wherein the laser further comprises an RF drive circuit connected to the second and third electrodes and operable to apply: a first RF drive voltage the second electrode; and a second RF drive voltage to the third electrode with a 120 degree phase shift to the first RF drive voltage, so that an equal voltage drop is applied across each of the first, second and third passageways.

3. The laser of clause 2, wherein the first and fourth electrodes form part of a common, electrically conducting housing.

4. The laser of clause 1, further comprising an RF drive circuit operable to generate an RF drive voltage and connected to apply the RF drive voltage to the second and third electrodes with the 120 degree phase shift.

5. The laser of clause 1, wherein the beam path passageways are waveguides.
6. The laser of clause 5, wherein the waveguides are slab waveguides.
7. The laser of clause 6, wherein the slab waveguides are arranged above one another in a stack.
8. The laser of clause 6, wherein the slab waveguides are arranged in a common plane.
9. The laser of clause 1, wherein the resonator cavity is bounded by first and second cavity end mirrors.

What is claimed is:

1. A laser comprising:
   a resonator cavity;
   a plurality of slab waveguides within the resonator cavity each providing a volume for accommodating a gain medium; and
   at least one cavity folding assembly configured to direct a radiation beam emitted from one of the slab waveguides into another of the slab waveguides,
   wherein the slab waveguides are physically arranged above one another in a stack and optically arranged in series through the or each cavity folding assembly,
   wherein each slab waveguide has a thickness sized to support at least one waveguide mode vertically in the slab waveguide and a width sized to support free space modes horizontally across the slab waveguide, and
   wherein the or each cavity folding assembly is configured to focus the radiation beam emitted from said one of the slab waveguides by an amount selected to couple at least the EH11 waveguide mode into said other of the slab waveguides,
   wherein the resonator cavity is bounded by first and second cavity end mirrors, and wherein the first and second cavity end mirrors and the or each cavity folding assembly are jointly configured such that the free space modes come to a focus part way along one of the slab waveguides.

2. The laser of claim 1, wherein the, each or at least one cavity folding assembly is configured to direct without focus the free space modes emitted from said one waveguide into said other waveguide.

3. The laser of claim 1, wherein the, each or at least one cavity folding assembly has an effective radius of curvature, R, equal to approximately twice the optical path length, Z, of the radiation beam as it traverses the cavity folding assembly during its passage between ones of the slab waveguides.

4. The laser of claim 3, wherein Z/R=0.50±0.20.

5. The laser of claim 1, wherein the, each or at least one cavity folding assembly has an effective radius of curvature, R, equal to approximately the optical path length, Z, of the radiation beam as it traverses the cavity folding assembly during its passage between ones of the slab waveguides.

6. The laser of claim 5, wherein Z/R=1.00±0.20.

7. The laser of claim 1, wherein the planes of the slab waveguides are all parallel to one another.

8. The laser of claim 1, wherein at least one of the slab waveguides lies in a plane that is tilted at an acute angle relative to at least one other of the slab waveguides.

9. The laser of claim 8, wherein the acute angle is between 5 and 45 degrees.

10. The laser of claim 1, wherein
    the gain medium is a gas and the laser further comprises electrodes which are drivable pairwise in use by a radio frequency, RF, drive voltage to discharge an RF electrical current through the gas,
    wherein an electrode is arranged between each slab waveguide, as well as above the uppermost one of the slab waveguides and below the lowermost one of the slab waveguides, such that there is a gap between vertically adjacent electrodes across which the RF electrical current can be discharged through the gas,
    wherein the electrodes above the uppermost one of the slab waveguides and below the lowermost one of the slab waveguides are electrically connected, so that in use they can both be maintained at electrical ground.

11. The laser of claim 1, wherein there are three of said slab waveguides, namely a first, a second and a third slab waveguide, and two of said cavity folding assemblies, namely a first and a second cavity folding assembly.

12. The laser of claim 11, wherein the second slab waveguide is intermediate the first and third slab waveguides and lies in a plane that is tilted at an acute angle relative to the first and third slab waveguides.

13. The laser of claim 12, wherein the acute angle is between 5 and 45 degrees.

14. The laser of claim 12, wherein each of the first and second cavity folding assemblies consists of a single mirror.

* * * * *